Feb. 17, 1970    R. D. WOOD    3,496,388
VARIABLE PULSE WIDTH TRANSDUCER CIRCUIT
Filed Nov. 13, 1967

INVENTOR.
RICHARD D. WOOD
BY *Elliott & Pastoriza*
ATTORNEYS

3,496,388
VARIABLE PULSE WIDTH TRANSDUCER
CIRCUIT
Richard D. Wood, Northridge, Calif.
(837 3rd St., Apt. 108, Santa Monica, Calif. 90403)
Filed Nov. 13, 1967, Ser. No. 682,448
Int. Cl. H03k 1/14
U.S. Cl. 307—265                                    5 Claims

ABSTRACT OF THE DISCLOSURE

A transducer circuit is provided for generating an output pulse of width constituting a function of variations in an input parameter such as a physical motion. The natural resonant period of this circuit is caused to change in accordance with variations in the input parameter. A reference pulse of known given width is generated and a sample pulse derived from the resonant circuit which has a width constituting a function of the period of free oscillations of the resonant circuit is generated. The reference and sample pulses are compared and an output pulse provided which will vary in width in accordance with variations in the width of the sample pulse. There thus results an output pulse having a width which varies in accordance with variations in the original input parameter.

---

Figure 1:
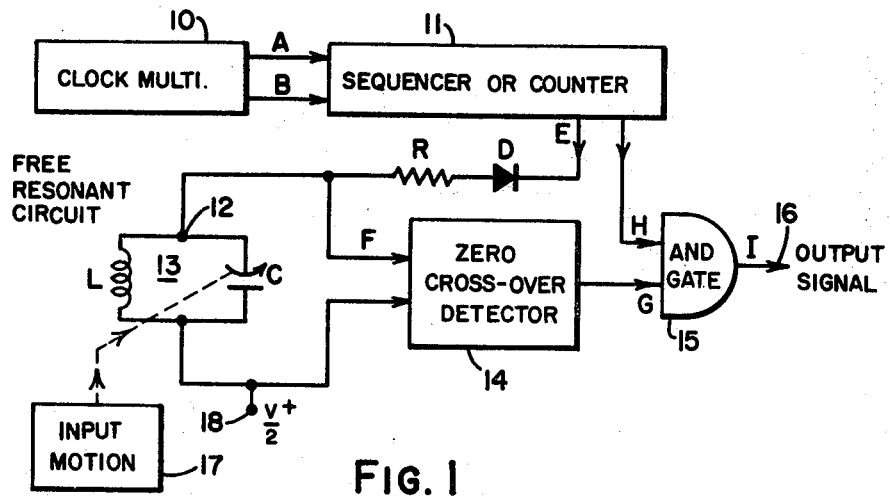

This invention relates generally to transducer circuits and more particularly to a novel circuit for converting the variations of a given parameter into an output electrical pulse of width varying in accordance with the input parameter.

Transducing systems in which a variable parameter such as a physical motion is converted into an electrical signal for ultimate processing in computers and the like are well known in the art. In many instances, it is desirable to provide the transduced signal in the form of a repetitive pulse having a width which varies as a function of the parameter. This type of digital output is particularly useful in conjunction with integrated circuits.

In such transducers as have been provided heretofore, there have been required components of close tolerances in conjunction with carefully regulated supply voltages in order to assure the desired accuracy in the output variations with changes in the input parameter. In addition, such systems have been subject to voltage drift, line noises, and other factors tending to result in instability with the result that consistent output variations are not always realizable. Many of these problems can, of course, be overcome by employing sophisticated circuitry including properly regulated supplies, compensating circuits, and the like. However, the costs involved in the added complexity of the circuit as well as the overall size can result in an impractical and economically unfeasible transducer.

With the foregoing considerations in mind, it is a primary object of the present invention to provide an improved transducer circuit capable of providing a variable width output pulse in a repetitive manner wherein the foregoing noted problems are substantially overcome.

More particularly, it is an object to provide a variable pulse width transducer circuit particularly well adapted to use with integrated circuitry and wherein high accuracy in the transducing operation with a high degree of stability is realized without having to employ close tolerances in many of the components all to the end that a greater economy is possible in the manufacture of the transducer.

Still another important object is to provide a variable pulse width transducer which is substantially independent of voltage drift or line noises in the supply voltages and wherein this isolation from such disturbances is effected without the use of expensive compensating circuits, regulated supplies, and the like to the additional end that the transducer can be made from a minimum number of components and thus of small size.

Briefly, these and other objects and advantages are attained by providing a resonant circuit having a natural resonant frequency which will vary in accord with changes in the value of one of its component elements. For example, the circuit may comprise an inductor and capacitance in parallel. By varying either the value of the inductance or the value of the capacitance, the resonant frequency may be changed.

In a particular embodiment of the invention, the input variable parameter may constitute a physical motion which motion is to be transduced into a variable pulse width. Towards this end, the physical motion is coupled directly to one of the elements in the resonant circuit to vary its value and thus the natural resonant frequency of the circuit will vary in accord with changes in the physical motion.

An impulse means provides an impulse signal to stimulate the resonant circuit into free oscillations. These free oscillations are detected and a sampling pulse of a width constituting a function of the period of the oscillations is provided. In addition, a reference pulse of a given known width is generated and this reference pulse together with the sample pulse from the resonant circuit are compared. The difference in width of these pulses then constitutes a function of the period of the resonant circuit and as this period changes as a consequence of changes in the input physical motion, the width of the final output pulse resulting from the comparing of the reference pulse with the sample pulse will change in accord with such variations. Suitable means are provided for assuring that the resonant circuit will be isolated after it has been stimulated so that it will always resonate at its natural resonant frequency. As a consequence, the output signal is completely independent of any line noise, voltage drifts, or other variations which might cause instability.

Figure 2:
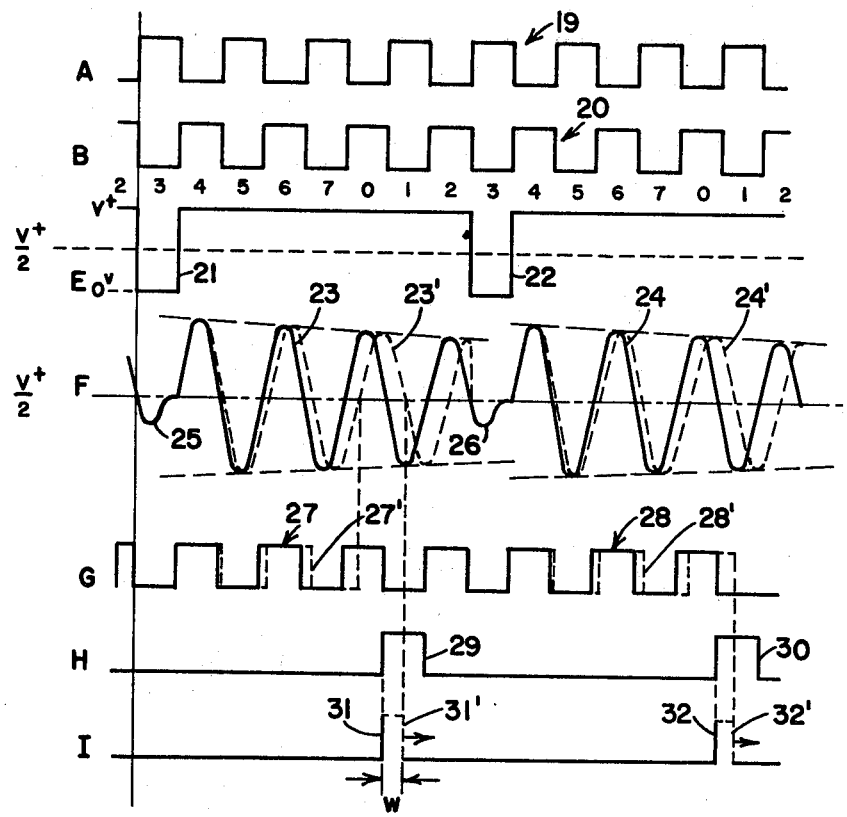

A better understanding of the invention will be had by now referring to a particular embodiment thereof as schematically illustrated in the accompanying drawings, in which:

FIGURE 1 is a circuit diagram partly in block form showing the basic components making up the transducer; and FIGURE 2 illustrates a series of lettered wave forms occurring at correspondingly lettered points in the circuit of FIGURE 1 useful in explaining the overall operation of the transducer.

Referring to FIGURE 1 there is shown an impulse means in the form of a constant frequency signal generator 10 and a sequencer 11 which might, for example, constitute a counter. In the particular embodiment shown, the constant frequency generator 10 may comprise a multivibrator for providing a square wave output wave form of fixed frequency.

A first output from the counter connects through a diode D and series resistance R to one side 12 of a free resonant circuit 13. This particular resonant circuit includes an inductance L and capacitance C connected in parallel as its component elements. It should be understood however that a series resonant circuit or any other type of resonant circuit capable of free resonant oscillations could be employed. As shown, the resonant circuit is connected through suitable leads to a means for providing a sample pulse of width constituting a function of the period of the resonant circuit. For example, this means may constitute a simple zero cross-over detector 14. The output sample pulse is passed to a gating means such as an and gate 15.

A second output from the counter 11 passes directly into the and gate 15 as shown. This second output carries a reference pulse of a known pulse width for comparison with the sample pulse from the zero cross-over detector. The output from the and gate appears on lead 16 and constitutes an output signal whose width varies in accord with variations in the natural resonant frequency of the resonant circuit 13.

The transducer is completed by a suitable input means 17 coupled to one of the component elements of the resonant circuit such as the capacitor C. The input means contains information concerning a particular variable parameter the variations of which are to be transduced into an output pulse of variable width. As a specific example, such parameter might be a physical motion which would be coupled from the input 17 directly to the capacitor C such that the value of the capacitor would change with changes in the physical position of the member whose motion is to be transduced. Changing of the value of the capacitance C will change the natural resonant frequency of the circuit. It should be understood that a change in the value of the inductance L could be effected as readily as a change in the value of the capacitance C to attain a similar result. A power supply voltage $V^+/2$ connects to the lower end of the resonant circuit 13 as shown at 18.

FIGURE 2 illustrates a series of wave forms A, B, E, F, G, H, and I occurring at the correspondingly lettered points in the circuit of FIGURE 1. Thus, in the particular example chosen for illustrative purposes, the two outputs from the clock multivibrator providing wave forms of fixed frequency are illustrated at 19 and 20 as two square waves 180° out of phase. The frequency of these wave forms is given a value at least as high as the highest contemplated natural resonant frequency of the resonant circuit 13.

These signals are passed into the counter 11 which may be adjusted to effect a desired number of counts in a cyclic manner. For example, a ring-type counter may be employed having eight distinct outputs such that after a count of eight, the ring counter simply commences counting over again. By this arrangement, it is possible to provide at the first output of the counter 11 an impulse signal repetitively, each signal being separated by an integral number of half cycles of the input wave form to the counter. For example, and as illustrated in wave form E of FIGURE 2 there are provided impulse signals 21 and 22 every eighth count the leading edges of these impulse signals being separated by exactly eight half cycles. In the absence of the impulse signals 21 and 22, the voltage on the line from the decoder 12 to the resonant circuit including the diode D and resistance R corresponds to the power supply voltage $V^+/2$ as indicated in FIGURE 2. Under these conditions, the resonant circuit 13 is essentially unloaded. The diode D and current limiting resistance R thus serve to isolate the resonant circuit 13 from the counter 11 providing the impulse signal until such time as an impulse signal is received.

Consider a given time when the first impulse signal 21 passes to the resonant circuit. This signal will cause a conduction of current from the voltage source 18 through the resonant circuit and diode D because of the change in voltage level effected by the impulse signal 21. At the end of the impulse signal 21, the voltage at the upper portion of the resonant circuit will assume the original $V^+/2$ value and the circuit will thereafter be isolated from the decoder. However, the current resulting from the impulse signal 21 will stimulate the resonant circuit into free oscillations such as indicated by the solid wave forms 23 designated F in FIGURE 2. When the next impulse signal 22 is received a given interval of time later, the resonant circuit will again immediately return to a completely damped condition and then be stimulated to commence another series of free oscillations designated 24. Because the Q of the circuit cannot be made perfect, there will be some slight damping of the oscillations as indicated in FIGURE 2.

The output from the zero cross-over detector 14 is indicated by wave form G and simply constitutes a series of sample pulses whose initial and end edges are defined at the cross-over points by any suitable well known circuit means. These pulses are indicated by the solid line square wave pulses 27 and 28. Referring once again to the free oscillation wave forms F, if a change in the natural resonant period of the circuit occurs as a result of a variation in the value of the capacitance C, a corresponding change will occur in the pulse width of the sample series of pulses G. Thus, assume that the value of the capacitance C is increased as a consequence of the input motion from the input parameter 17. The resulting increase in the natural period of oscillation is indicated by the dotted line wave forms 23' and 24' in FIGURE 2. This increase in the period will also result in an increase in the pulse width of the sample pulses in wave from G as indicated by the dotted line sample pulses 27' and 28', these pulses occurring at the new cross-over points for the increased period oscillations 23' and 24'.

The second output from the sequencer or counter 11 constitutes a reference pulse 29 which is caused to occur at a specific count of the repetitive counting cycles. For example, this reference pulse 29 may be provided at the count 1 and thus will follow the impulse signal 21 by a definite number of half cycles of the constant frequency wave forms provided by the multivibrator 10. One means of providing the pulse 29 would be to simply gate the positive pulse from the wave form A occurring at the time 1 in the counting cycle.

The reference pulse 29 indicated as wave form H passes into the and gate 15 along with the sample pulses 27. The and gate is characterized in that it will only provide an output signal when both of its inputs have a positive signal thereon.

Wave form I illustrates at 31 the output pulse from the and gate 15. When the natural resonant frequency is as indicated by the wave form 23, the pulse width of the output pulse is essentially zero. When the natural resonant period increases as indicated at 23' and 24', the output pulse will be as indicated at 31' having a definite pulse width $w$ constituting a function of the changed period of the oscillations 23'.

It will be understood from the foregoing that the period of oscillations denoted by the solid wave form 23 for the resonant circuit will constitute the shortest contemplated resonant period and this will correspond to a zero pulse width output. As the period of the resonant circuit increases by a change in its capacitance in one direction, there will result an overlapping of the sample pulse 27' with the reference pulse 29 and the output pulse essentially constitutes a pulse of width corresponding to the overlap. A change in the parameter back towards its initial condition will vary the period of the resonant circuit from that depicted by the dashed curve 23' towards the solid line curve 23 and will result in a narrowing of the pulse width of the output pulse 31. It should be understood accordingly that the solid line resonant curve 23 represents one of the extreme positions of the transducer circuit.

It will be evident from the foregoing description, that a series of output pulses as indicated at 31' and 32' will be provided in a repetitive manner separated by a fixed number of half cycles determined by the setting of the counter 11. The integral number of half cycles preferably lies between one and that number of half cycles occurring before the free resonant oscillations of the resonant circuit have decayed more than fifty percent. As mentioned heretofore, the particular number in the example set forth is eight but it should be understood that a different count number could be selected. It is only necessary that the impulse signals be generated at consistent time intervals and that the reference pulse such as 29 be generated at consistent time intervals consistently spaced from the impulse signals. With these conditions assured, a comparison of the relative width of the reference pulse and the sample pulse from the zero cross-over detector will provide the desired variable width output pulse.

In view of the foregoing, it can be appreciated that the circuit will operate substantially independently of line noise or variations in line voltage. Further, extreme stability is realized since the resonant circuit itself is isolated for free oscillations in every instance and thus is independent of any transient signals or errors that may develop in the other circuit components. In this respect, it should be understood that the input of the zero cross-over detector 14 has an extremely high impedance so that the resonant circuit is essentially unloaded by the zero cross-over detector or other means employed for providing a sample pulse.

While only one particular means of providing an impulse signal has been described it should be understood that other equivalent clock or timing means could be employed. Further, circuits equivalent to the zero cross-over detector and the and gate as described could be employed for providing the desired variable output pulse width signal. The invention accordingly is not to be thought of as limited to the particular examples set forth.

What is claimed is:

1. A variable pulse width transducer circuit comprising: a resonant circuit having a natural resonant period constituting a function of the value of at least one of its component elements; means for varying said value in accordance with variations in an input parameter to be transduced; means for stimulating said resonant circuit into free oscillation; blocking means connected between said means for stimulating said resonant circuit and said resonant circuit for isolating said resonant circuit from said means for stimulating said resonant circuit after oscillation of said resonant circuit has been stimulated so that said resonant circuit oscillates freely at its natural resonant frequency; means for generating a reference pulse of known fixed width; means responsive to said free oscillations for generating a sample pulse of width constituting a function of the period of said resonant circuit; and means receiving said reference pulse and said sample pulse to provide an output pulse of width constituting a function of the difference in the widths of said reference pulse and sample pulse.

2. A variable pulse width transducer circuit comprising, in combination: a resonant circuit having a natural resonant period constituting a function of the value of at least one of its component elements; means coupled to said one of said component elements for varying said value in accordance with variations in an input parameter to be transduced; impulse means for generating an impulse signal connected to said resonant circuit to stimulate said resonant circuit into oscillation at a given time; blocking means connected between said impulse means and said resonant circuit for isolating said resonant circuit from said impulse means after oscillation of said resonant circuit has been stimulated so that said resonant circuit oscillates freely at its natural resonant frequency; means for generating a reference pulse of known width at a time a given fixed interval after said given time of said impulse signal; detecting means responsive to said resonant circuit for generating a sample pulse of width constituting a function of the natural period of said resonant circuit at the end of a fixed number of cycles of said resonant circuit such that said reference pulse of known width and said sample pulse of width constituting a function of said natural period overlap; and gating means connected to receive said reference pulse and sample pulse and provide an output pulse of width constituting a function of said overlap whereby changes in said natural period will result in changes in the width of said output pulse.

3. A circuit according to claim 2, in which said impulse means includes means for generating a wave form of constant frequency corresponding to the highest contemplated natural resonant frequency of said resonant circuit, said impulse signal being generated at successive given times separated by a fixed integral number of half cycles of said wave form, said reference pulse being repetitively generated at said given fixed interval after each impulse signal; and said detecting means constituting a zero cross-over detector to provide a series of said sample pulses after each impulse signal whereby said output signal of variable width is repetitively provided at intervals corresponding to said fixed integral number of half cycles of said wave form.

4. A circuit according to claim 3, in which said fixed integral number corresponds to a number between one and that number of half cycles of said resonant circuit occurring before the amplitude of said free oscillations has decayed more than fifty percent.

5. A circuit according to claim 3, in which said resonant circuit includes an inductance and capacitance as component elements, said blocking means including a diode, and in which said impulse generating means includes a fixed frequency generator, counter circuit, and decoder circuit connected so that said counter and decoder circuit count said integral number of half cycles and thence reset and repeat, said impulse signal being generated each time a specific count is reached.

References Cited

UNITED STATES PATENTS

| | | | |
|---|---|---|---|
| 3,049,912 | 8/1962 | Cronin | 328—58 X |
| 3,204,197 | 8/1965 | Manzan | 328—134 X |
| 3,250,923 | 5/1966 | Liska et al. | 307—265 X |

JOHN S. HEYMAN, Primary Examiner

R. C. WOODBRIDGE, Assistant Examiner

U.S. Cl. X.R.

331—1; 378—58, 133, 134